Jan. 20, 1970   F. BERZ ET AL   3,490,847

INTERNAL REFLECTION DEVICES, ESPECIALLY FOR USE IN SPECTROSCOPY

Filed May 17, 1966   2 Sheets-Sheet 1

PRIOR ART

INVENTOR.
FEODORA BERZ
JULIAN R. A. BEALE
BY
AGENT

INVENTOR.
FEODORA BERZ
JULIAN R. A. BEALE
BY
AGENT

United States Patent Office 3,490,847
Patented Jan. 20, 1970

3,490,847
INTERNAL REFLECTION DEVICES, ESPECIALLY FOR USE IN SPECTROSCOPY
Feodora Berz, Shepherds Bush, and Julian Robert Anthony Beale, Surrey, England, assignors, by mesne assignments, to U.S. Philips Corporation, New York, N.Y., a corporation of Delaware
Filed May 17, 1966, Ser. No. 550,736
Claims priority, application Great Britain, May 24, 1965, 21,866/65
Int. Cl. G01j 3/02
U.S. Cl. 356—74      7 Claims

ABSTRACT OF THE DISCLOSURE

An internal reflection device for spectroscopy wherein a film is provided on the surface of the element which is brought into contact with an absorbing medium to be analyzed. The film has characteristics such that the reflectivity at the element-film interface is substantially of opposite phase with the reflectivity at the film-absorbing medium interface, with the result that a standing wave of high intensity is built up within the film producing enhanced interaction with the absorbing medium.

---

This invention relates to devices employing the phenomenon of frustrated total internal reflection, and has special application in internal reflection spectroscopy.

It is well known that electromagnetic energy travelling in a transparent medium or refractive index $n_1$ will be totally reflected at an interface of this medium with another of lower refractive index $n_2$, provided that the angle of incidence $\theta_1$ of the beam of radiation at the interface satisfies:

$$\theta_1 \geq \sin^{-1} \frac{n_2}{n_1} \qquad (1)$$

($\sin^{-1} \frac{n_2}{n_1}$ is the so-called "critical angle.")

It has been proposed by Harrick [J. Phys. Chem., 64, 1110–1114 (1960); Annals of the New York Academy of Sciences, 101 (Article 3), 928–959 (1963); Anal. Chem., 36, 188–191 (1964)] that this phenomenon may be employed in devices for the study of the surfaces and the immediate neighborhood of the surfaces of substantially radiation-transparent materials. In operation, a beam of radiation is incident on a body of transparent material having a refractive index $n_1$. The beam after being multiply totally internally reflected in the material emerges as an exit beam. The body is surrounded by a medium having refractive index $n_2$ and the angles which the beam makes with the material/medium interfaces are arranged to satisfy Equation 1 above. Consequently, in the ideal case, the intensity of the exit beam differs from that of the incident beam only insofar as absorption has occurred in the surrounding medium, the reflection coefficients at the interfaces being 100%. When molecules are present on or very close to and outside of the reflecting surfaces of the body, and these molecules exhibit a resonance whose frequency coincides with a frequency of the incident radiation, radiation traversing the material will be absorbed when it is incident upon them. Thus, the total internal reflection is frustrated and some of the traversing radiation is lost and the intensity of the exit beam diminishes at the resonant frequency. If the incident beam covers a wide spectral band which includes one or more resonances, a spectral analysis of the exit beam will disclose excessive decreases in intensity at these resonant wavelengths, compared with the intensity of the incident beam at those wavelengths. In other words the transmission factor of the external material will vary with wavelength if the wavelength range considered includes such a resonance, and a plot of transmission factor against wavelength will exhibit dips at the resonant frequencies. The wavelengths at which these dips occur may give information as to the nature and state of the molecules. It should be noted that, in general, molecules in the medium must be within a distance of the order of one tenth of the wavelength of the incident radiation from a material/medium interface in order to have an appreciable effect on the transmission coefficient, because this distance is roughly the depth of penetration of the radiation into the medium. Harrick suggests a body in the form of a thin plate and in similar shapes in order that multiple reflections of the beam at the material/medium interfaces may occur therein, thus achieving multiple interactions with the molecules and thereby improving the sensitivity of the device. The sensitivity of the device also depends on the intensity of the radiation at the material/medium interfaces.

The main object of the invention is to provide such a device in which the radiation intensity may be increased at one or more of these interfaces, thereby improving the sensitivity still further.

In accordance with the invention, the device is provided with a thin film or layer of radiation-transparent material of smaller refractive index than that of the body, and the external material to be analyzed is placed in contact (or within $\frac{1}{10}$ of a wavelength) of the external surface of said layer. In particular, with a body of refractive index $n_1$ having a layer of refractive index $n_3$ in contact with or close to a medium having a refractive index $n_2$, a substantially parallel beam of radiation of wavelength $\lambda$ in free space is directed through said body of refractive index $n_1$ so that it is incident on said first boundary face at an angle of incidence $\theta_1$ where:

$$n_3 > n_1 \sin \theta_1 > n_2 \qquad (2)$$

and refracted into the layer with an angle of refraction $\theta_2$ where:

$$4\pi \frac{n_3 d}{\lambda} \cos \theta_2 + (\theta_r)_6{}^7 - (\theta_r)_2{}^5 = (2k+1)\pi \qquad (3)$$

where $d$ is the layer thickness, $k$ is an arbitrary integer ($k = 0, 1, 2, \ldots$), $$(\theta_r)_6{}^7 \text{ and } (\theta_r)_2{}^5$$

are the phase changes (in radians) on reflection at layer-medium and body-layer interfaces, respectively, and such that the area of incidence of a coherent part of said beam on said first boundary face has a length $l$ in the plane of incidence which satisfies:

$$l \gg \frac{2d \tan \theta_2 (1+r_1)}{1-r_1} \qquad (4)$$

where $r_1$ is the coefficient of reflection for that part of said parallel beam travelling in said radiation-transparent material of refractive index $n_1$ which is immediately reflected at said first boundary face. Under the above conditions, a standing wave of light of great amplitude or intensity can be built up within the layer, producing amplification of the absorption at the reflecting interface where the reflection is frustrated.

The values of $$(\theta_r)\frac{7}{6} \text{ and } (\theta_r)\frac{5}{2}$$

are known (see for example, Born and Wolf, Principles of Optics, Pergammon Press, 1959). Here and in what follows the superscript refers to the interface and the subscript the medium under consideration (see FIG. 3).

The invention will now be described more fully, by way of example, with reference to the accompanying diagrammatic drawings, in which.

Where possible similar items have been given identical reference numerals in the figures.

Figure 1:
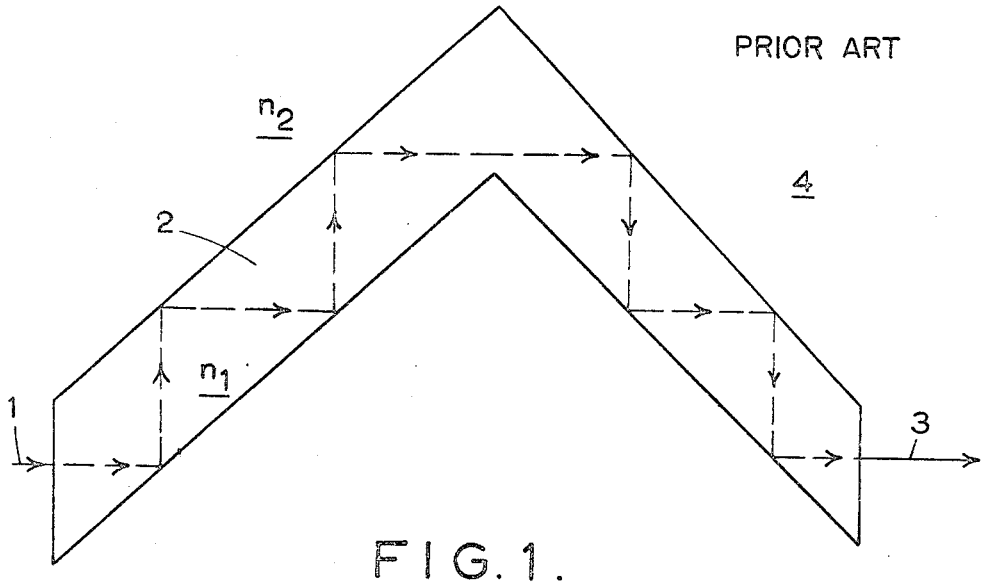
FIG. 1 illustrates the prior art Harrick device.

FIG. 1 illustrates the prior art structure. A beam of radiation 1 is incident on a substantially transparent body 2 of refractive index $n_1$ so as to propagate through the body 2 by means of multiple reflections from its major surfaces, as a result of the angle of incidence being chosen to exceed the critical angle $\theta_c$. The emerging beam is designated 3. With a medium 4 of refractive index $n_2$ on or close to the surfaces of the body 2, and with the usual auxiliary equipment of an infrared spectrophotometer present, such as a monochromator, intensity detector and X-Y recorder, a chart of beam intensity as a function of wavelength similar to the classic infrared spectra is obtained.

Figure 3:
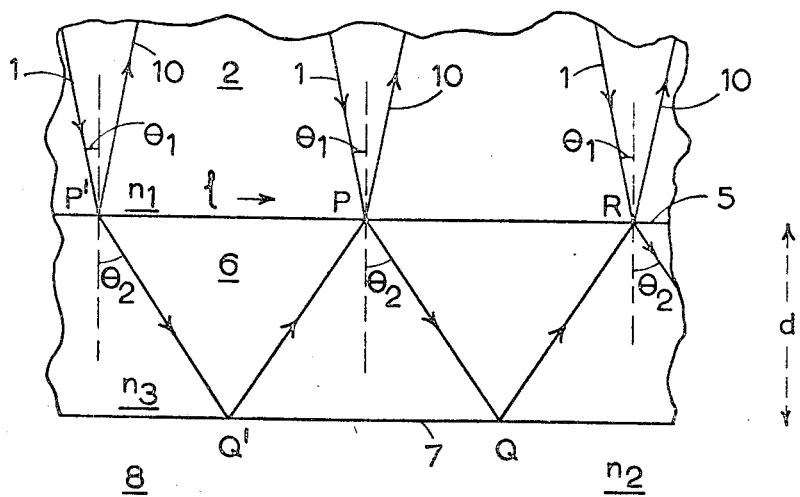
FIG. 3 shows part of the embodiment of FIG. 2 in more detail.
Figure 2:
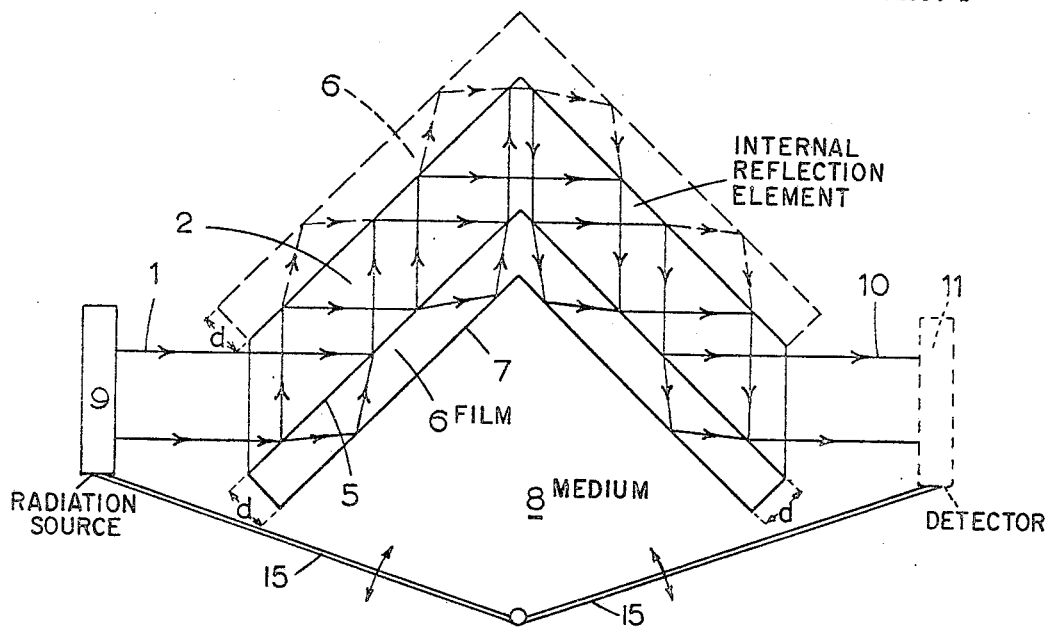
FIG. 2 shows one embodiment of the invention.

In the present invention, similar apparatus is employed, except that a thin layer of refractive index $n_3$ is provided on the body surfaces such that it exists between the body 2 and the external medium 4. FIG. 2 shows a side view of one form of such a device in accordance with the invention. The device (not drawn to scale) comprises a radiation-transparent material or body 2 of refractive index $n_1$ having a first substantially flat boundary face 5 in contact with a layer or film 6 of radiation-transparent material of refractive index $n_3$ and thickness $d$. This layer 6 has a second substantially flat boundary face 7 parallel to the face 5 and in contact with a medium 8 (corresponding to the medium 4) having a refractive index $n_2$. This device includes a source 9 of the radiation. This source emits a parallel beam 1 of radiation of wavelength $\lambda$ which, as will be seen from FIG. 3, is directed through the material of refractive index $n_1$ so that it is incident on the first boundary face at an angle $\theta_1$ which is arranged to satisfy Equation 2 above and refracted into layer 6 at an angle $\theta_2$ arranged to satisfy Equation 3 above. The area of incidence of a coherent part of the beam incident on face 5 has a length $l$ in the direction shown which satisfies Equation 4 above, where $r_1$ is the coefficient of reflection for the part of the beam 1 which is immediately reflected as beam 10 at the face 5 without first being refracted into layer 6. The total reflected beam 10 comprises an immediately reflected component and a component reflected after traversing layer 6. Beam 10 may be detected in a detector 11 (shown dotted) responsive thereto.

The device operates as follows:

Equation 3 ensures that the effective optical path through layer 6 is an odd multiple of $\lambda/2$ for the incident angle $\theta_1$. In particular, for $k=0$, the layer 6 is a quarter wave layer. Equation 2 ensures that there is transmission in layer 6 and total reflection at face 7.

Considering for convenience only the case of s polarization for the beam 1 (electric vector perpendicular to the plane of incidence), and where:

$$n_1 > n_3 \qquad (5)$$

the reflected beam 10 is the sum of two contributions, one due to that component immediately reflected at face 5 and the other resulting from the component emerging in material 2 after one or many transits in layer 6. The total amplitude reflectance $r$ into material 2 can therefore be written in the form $$r = r_1 + r_1' \qquad (6)$$

where $r_1$ and $r_1'$ correspond to the contributions mentioned above.

The signs of $r_1$ and $r_1'$ can be deduced from the phase changes $\theta_r$ on reflection, and transmission, and from the path length through the layer 6.

It is known (see Born and Wolf, loc. cit.) that, due to Equations 2 and 5 above, $$(\theta_r)_2^5 = 0 \qquad (6a)$$

$$(\theta_r)_6^5 = \pi \qquad (6b)$$

$$\cos \frac{(\theta_r)_6^7}{2} = \frac{n_3 \cos \theta_2}{\sqrt{n_3^2 - n_2^2}} \qquad (6c)$$

(Here and in what follows the superscript gives the reference numeral of the boundary face, and the subscript the reference numeral of the material under consideration, except for the symbol for the refractive index.) The phase changes on transmission are always zero. It is seen therefore that due to (6a) $r_1$ is positive and since energy is conserved one may write:

$$0 < r_1 < 1 \qquad (7)$$

and due to (3) and (6b) and (6c)

$$r_1' < 0 \qquad (8)$$

This means that $r_1$ and $r_1'$ are of opposite sign.

Equation 2 ensures that total reflection occurs at face 7, so that all the incident energy of the beam 1 must eventually be reflected back into material 2. This means that $|r| = 1$ for a sufficiently wide beam, for which the reflectance coefficient $r$ becomes independent of position, and therefore due to (7) and (8)

$$r = -1 \qquad (9)$$
$$r_1' = -1 - r_1 \qquad (10)$$

Let $$(E_i)_2^5 \text{ and } (E_r)_2^5$$

be the electric vectors associated at face 5 with the incident beam 1 and the overall reflected beam 10.

Since $r = -1$, one has $$(E_r)_2^5 = -(E_i)_2^5 \qquad (11)$$

i.e. the total electric vector $$(E)_2^5$$

is zero $$(E)_2^5 = (E_i)_2^5 + (E_r)_2^5 = 0 \qquad (12)$$

Considering now layer 6, it is seen that the total wave pattern therein results from waves bouncing back and forth between the faces 5 and 7, along paths such as those shown in FIGURE 3 with no loss on reflection at the face 7, and some loss at face 5, due to transmission into material 2. Due to Equations 3, 6b and 6c all the waves directed along $\overline{PQ}$ are in phase, whatever the number of transits within the layer, and the same is true for waves directed along $\overline{QR}$. Also the electric vectors for these two groups of waves are equal.

$$|E_{PQ}| = |E_{QR}| = E \qquad (13)$$

The interference of these two groups forms a standing wave pattern.

Due to the continuity of the total electric vector E across the face 5 and to Equation 12 it is seen that $$(E)_6^5 = 0$$

$$(E_{PQ})_6^5 = -(E_{QR})_6^5 \qquad (14)$$

This means that the standing wave pattern has a node at the face 5.

However, there is total reflection along the face 7 and the phase change $$(\theta_r)_6^7 \text{ thereat (Equation 6c)}$$

$$(E_{PQ})_6^7 = E \sin \omega t$$

$$(E_{QR})_6^7 = E \sin (\omega t + (\theta_r)_6^7)$$

and therefore the total vector $$(E)_6^7$$

at the interface 7 is given by $$(E)_6^7 = (E_{PQ} + E_{QR})_6^7$$
$$= 2E \cos \frac{(\theta_r)_6^7}{2} \sin \left(\omega t + \frac{(\theta_r)_6^7}{2}\right) \quad (15)$$

i.e. using (6c)

$$|E|_6^7 = 2E \frac{n_3 \cos \theta_2}{\sqrt{n_3^2 - n_2^2}} \quad (16)$$

Due to the continuity of the electric vector across face 7 its amplitude at Q in medium 8 must also be equal to $$|E|_6^7$$

$$|E|_8^7 = |E|_6^7$$
$$= 2E \frac{n_3 \cos \theta_2}{\sqrt{n_3^2 - n_2^2}} \quad (17)$$

Since however there is total reflection at face 7, the wave in medium 8 must not carry any flux of energy, i.e. it must be evanescent. The electric field $E(z)$ in medium 8 is given by $$E(z) = |E|_8^7 e^{-\gamma z} \quad (18)$$

where $z$ is the distance from interface 7, and $$\gamma = \frac{2\pi}{\lambda} (n_3^2 \sin^2 \theta_2 - n_2^2)^{1/2} \quad (19)$$

(see Born and Wolf, loc. cit.).

The amplitude E can be calculated from the reflectance coefficient $r_1$ as follows:

Let $$(E_t)_{62}^5$$

be the electric vector associated with the wave transmitted from material 6 to material 2. By definition of $r_1'$ and of transmittance coefficient $t_{62}$, $$|E_t|_{62}^5 = |r_1'| |E_i|_2^5$$
$$= t_{62} E \quad (20)$$

Moreover it is known from the aforementioned publication by Born and Wolf that $$t_{62} = 1 - r_1 \quad (21)$$

Using (21), (10) and (7) in (20) one gets $$E = \frac{|r_1'|}{1 - r_1} |E_i|_2^5$$
$$= \frac{1 + r_1}{1 - r_1} |E_i|_2^5 \quad (22)$$

The maximum field $E_{Max}$ within the layer for $k \neq 0$ in Equation 3 is given by $$E_{max} = 2E$$
$$= a|E_i|_2^5 \quad (23)$$

where $a$ is by definition the amplification factor.

According to (22) and (23), and the Fresnel's equation (Born and Wolf, loc. cit.)

$$r_1 = \frac{n_1 \cos \theta_1 - n_3 \cos \theta_2}{n_1 \cos \theta_1 + n_3 \cos \theta_2}$$

one has $$a = 2 \frac{1 + r_1}{1 - r_1}$$
$$= 2 \frac{n_1 \cos \theta_1}{n_3 \cos \theta_2} \quad (24)$$

For $\theta_2 \approx \pi/2$, one has according to Snell's law $$n_1 \cos \theta_1 = \sqrt{n_1^2 - n_3^2 \sin^2 \theta_2}$$
$$\approx \sqrt{n_1^2 - n_3^2}$$

and therefore $$a \approx 2 \frac{\sqrt{n_1^2 - n_3^2}}{n_3 \cos \theta_2} \quad (25)$$

It is therefore seen that for $\theta_2 \approx \pi/2$ $a$ can be very large, i.e., an electric field of very large amplitude can be obtained in layer 6, and therefore this layer acts as a light condenser.

For $k=0$, Equation 3, the largest electric field is at the interface 7. It is seen from what follows that this is smaller than $E_{Max}$, when $\theta_1$ is different from the critical angle $\theta_c$ ($\theta_c = \sin^{-1} n_2/n_1$).

For any value of $k$, it can be seen from Equations 16, 17, 23 and 24 that $$|E|_6^7 = |E|_8^7$$
$$= 2 \frac{n_1 \cos \theta_1}{\sqrt{n_3^2 - n_2^2}} |E_i|_2^5 \quad (26)$$

In the absence of the intermediate layer 6 one would have, similarly to (16), for the total field $$|E^\circ|_8^5$$

at the interface between media 2 and 8

$$|E^\circ|_8^5 = 2|E_i|_2^5 \cos \frac{(\theta_r)_8^2}{2}$$
$$= 2 \frac{n_1 \cos \theta_1}{\sqrt{n_1^2 - n_2^2}} |E_i|_2^5$$

One therefore has $$|E|_8^7 = \frac{\sqrt{n_1^2 - n_2^2}}{\sqrt{n_3^2 - n_2^2}} |E^\circ|_8^5 \quad (27)$$

It follows from Equation 5 that one has $$|E|_8^7 > |E^\circ|_8^5$$

i.e., there will be amplification, due to layer 6, of the evanescent wave transmitted in medium 8.

This property has advantages especially when applied to devices wherein electromagnetic energy is caused to interact with a substance at or close to a totally internally reflecting interface between two media, for example in the frustrated total internal reflection spectroscope proposed by Harrick in the reference quoted in the preamble. It will be seen that the radiation intensity will be increased at the interface where the interaction takes place, thereby improving the sensitivity of the device.

The operation of this spectroscope is based on the interaction of the alien molecules with the evanescent wave which arises near the interface in the medium containing these molecules. If these molecules are in medium 8 in FIGURE 2, and close to or in contact with face 7, according to Equations 27 and 5 the presence of the layer 6 will amplify the interaction. More precisely the reflectance at face 7 can be calculated as follows:

The average power $P_i$ incident per unit area at the interface 5 is within a constant factor given by $$P_i = |E_i^2|_2^5 \cos \theta_1 \quad (28)$$

On the other hand it has been shown by N. J. Harrick [J. Amer. Optical Soc., 55, 851–857 (June 1965)] that the average power $P_a$ absorbed in medium 8 is within the same factor given by $$P_a = \alpha \int_8 E^2(z) dz \quad (29)$$

where $\alpha$ is the absorption constant, characteristic of the species under investigation, and the integral is taken along the normal $z$ in medium 8. It is assumed that the absorption is so weak that it acts only as a perturbation on the results given above. $E(z)$ is then the evanescent field given by Equation 18.

Equations 18 and 29 give $$P_a = \alpha h |E^2|_s \qquad (30)$$

where $h$ is the thickness of the absorbing layer in medium 8, if this layer is very thin ($h \ll 1/\gamma$). Layers much thicker than $1/\gamma$ can be considered as infinite, and in this case $h = \frac{1}{2}\gamma$.

The reflected power coefficient R is given by $$R = |r|^2 = 1 - P_a/P_1$$
$$= 1 - \Delta R \qquad (31)$$

where $\Delta R = P_a/P_1$ is the change in R due to absorption. Using (28), (30), and (27) one gets $$\Delta R = \alpha h \frac{4n_1^2 \cos \theta_1}{n_3^2 - n_2^2} \qquad (32)$$

In the absence of the intermediate layer 6 one could see from similar considerations that the change $\Delta R^\circ$ in the reflection coefficient due to the absorbing species would be $$\Delta R^\circ = \alpha^\circ h \frac{4n_1^2 \cos \theta_1}{n_1^2 - n_2^2} \qquad (33)$$

where $\alpha^\circ$ is the absorption coefficient in the present system. One would have $\alpha^\circ \neq \alpha$, when the nature of the interface has an effect on absorption, due to interaction of the absorbed species with the substrate.

It follows from (32) and (33) that $$\frac{\Delta R}{\Delta R^\circ} = \frac{\alpha}{\alpha^\circ} \frac{n_1^2 - n_2^2}{n_3^2 - n_2^2} \qquad (34)$$

which is consistent with Equations 27 and 30.

One therefore has $\Delta R > \Delta R_0$ when $n_1 > n_3$, and $\alpha$ is not much smaller than $\alpha^\circ$. This again means that the presence of layer 6 will lead to an appreciable amplification of absorption.

In practice, for the near infra-red, layer 6 could be made of silica ($n_3 = 1.45$) deposited on a substrate made of silicon ($n_1 = 3.5$). Alternatively $n_1$ could equal 4 (Ge). If $n_2 = 1$, and $\alpha = \alpha^\circ$, one has, according to (34), $\Delta R/\Delta R_0$ equal to 10 or 13.5 for the two substrates respectively. Many other materials can be used in place of silicon and silica, as will be evident from the table on page 189 of Harrick's article in "Analytical Chemistry."

The described operation of the device assumes (in addition to a monochromatic beam) the following:

(a) The beam 1 is parallel
(b) The layer 6 is of constant thickness
(c) The absorption in the layer 6 is small
(d) Light is coherent over a significant portion of the incident beam
(e) The beam is wide enough for the total reflection coefficient $r$ to be independent of position.

The device may also be used to study infra-red absorption in the layer 6 itself because of the large fields occurring therein. In this case assumption (c) is not needed, in fact the greater the absorption occurring in layer 6 in this case due to the desired interaction the better.

Assuming (e) means that the contribution $r_1'$ is made up by an infinite number of components such as PQR, P'Q'PQR, etc. (FIGURE 3), which are characterized by the number of reflections ($n$) they have undergone at the face 7 ($n = 1, 2 \ldots$). In practice, the incident beam is of finite width $l$ and therefore, the number of components contributing to $r_1'$ is finite within the area covered by the beam. For instance only two components ($n=1$ and $n=2$) would be effective at point R if the beam covered only the area P'R in FIGURE 3. Moreover, as can be seen from Equation 21, the contribution of each component is small, where $r_1 \approx 1$, as is always the case for large values of $a$, and it is of opposite sign to $r_1$ (as in Equations 7 and 8). This means that, as the number of components increases, the reflectance coefficient varies slowly from $r_1$ ($>0$) to $-1$.

A precise calculation shows that at a point where $n$ components contribute to the reflection, the total reflectance coefficient $r_n$ at the face 5 is given by $$r_n = -1 + \left[1 - \frac{4}{a}\right]^n \left[2 - \frac{4}{a}\right] \qquad (35)$$

If the maximum number of components is N and $N/a$ is large, the average reflectance coefficients $\bar{r}_N$ is given by $$\bar{r}_N = \frac{1}{N+1} \sum_{n=0}^{N} r_n$$

$$\approx -1 + \frac{a}{2(N+1)} \qquad (36)$$

In order to approximate to the ideal case of an infinite number of components one must therefore have $$2N \gg a \qquad (37)$$

The area of incidence of the coherent beam 1 on the face 5 must therefore have a minimum length $l$ in the plane of incident so that (37) is satisfied. From simple geometrical considerations from FIGURE 3 and from Equation 24 $l$ must satisfy:

$$l \gg \frac{2d \tan \theta_2 (1+r_1)}{1-r_1}$$

fo $a=10$ one should have $N \geqslant 50$, according to (37).

In the case of a SiO$_2$ layer on Si, quoted in the example, $a=10$ corresponds to $\theta_1 = 22°$ (Equation 24), and $d = 0.17\lambda$ (Equations 3 and 6). One would then have for $N=50$, $l=33\lambda$ which corresponds to a path length within the layer 6 of the same order. It will thus be seen that the beam width requirement is easily met. It should also be appreciated that substantial compliance with assumptions (a)–(e) will produce enhanced absorption, and the extent to which full compliance is achieved will determine the extent of the enhancement obtained.

When the device is a frustrated internal reflection infrared spectroscope, the source 9 may be a standard infrared emitter such as a tungsten bulb, with or without a periclase window, a "Globar" rod, or a Nernst filament, etc., the choice depending on the infrared range under investigation. With these sources and suitable optics, a parallel and coherent beam is readily achieved. The usual gratings will provide adequate monochromization. A laser is another suitable beam source.

A chopper may be provided in front of the source in order to increase the sensitivity of detection.

Figure 4:
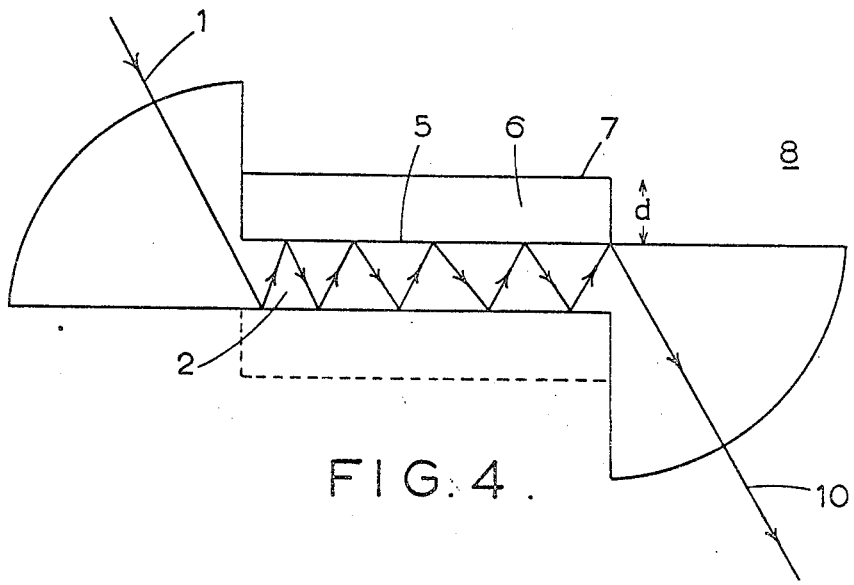
FIG. 4 shows a further embodiment of the invention.

Detector 11 may be a suitable thermopile. The source 9 and detector 11 may then be mounted on the arm of a goniometer, shown schematically at 15 in FIG. 2, so that radiation may be directed onto layer 6 with a variable angle of incidence $\theta_1$ and detected therefrom. If it is desired to vary $\theta_1$ appreciably, the entrance and exit faces of the material 2 are preferably curved, for example in the manner shown in FIGURE 4, so that the radiation may be incident thereon and emerge therefrom in a direction normal to material 2.

In operation, the alien molecules to be investigated may be brought very close to, or in contact with face 7, for example by providing them in the form of a gas, layer, or a powder deposited on this face. Infrared absorption is then measured at various wavelengths $\lambda$ which are selected, for example, by means of a monochromator placed either between the source 9 and the material 2 or between the material 2 and the detector 11. The radiation is caused to be incident on the face 5 with the correct angle $\theta_1$ so that Equation 3 is satisfied for the wavelength $\lambda$ under consideration by rotating the source goniometer arm 15 and/or the part of the device comprising elements 2 and 6, the goniometer detector arm 15 being rotated in correspondence therewith so that it picks up the reflected radiation. A plot of detector output, or more usefully total power reflection coefficient $|r|^2$ against $\lambda$, may then be made to yield a curve exhibiting dips at certain wavelengths, the wavelengths at which these occur yielding information about the alien molecules.

Care should be taken to ensure that the dips considered all arise from the presence of the alien molecules and do not arise from spurious absorption, for example, in the material 2 or the layer 6 (is the layer 6 is not itself under investigation). This may be done by means of a double-beam system, i.e., by comparing the output radiation from two identical devices, one having the alien molecules to be investigated deposited on its face 7 and the other without such a deposit.

In order to cover a wide range in λ, several devices may be employed with layers 6 of different thicknesses and possibly also made of different substances, each suitable for a specific part of the wavelength range employed. It will be further understood that the layer 6 can be provided on a hemicylinder which employs a single reflection and also achieve enhanced absorption.

While we have described our invention in connection with specific embodiments and applications, other modifications thereof will be readily apparent to those skilled in this art without departing from the spirit and scope of the invention.

What is claimed is:

1. An internal reflection element for use in internal reflection spectroscopy, comprising a substantially radiation transparent body of a material having a relatively high index of refraction and a thin film on a surface portion of said body, said film having a thickness of the order of one-quarter wavelength, said film being of a substantially transparent material having a relatively low index of refraction, said body being constructed to receive a beam of radiation and impinge same through the film on the outer surface of the latter at an angle exceeding the critical angle so as to cause said beam to be totally reflected from that outer surface except as frustrated by the presence of an absorbing medium adjacent said outer surface.

2. An internal reflection element as set forth in claim 1 wherein the body is in the form of a thin plate, and the film is provided on at least one major surface of the plate.

3. In an internal reflection spectrophotometer comprising radiation-beam-producing means for directing a beam of radiation including at least one selected wavelength λ through a substantially transparent internal reflection element of relatively high refractive index material for interaction with an absorbing medium exhibiting selective absorption of said radiation at said selected wavelength on an outer surface thereof and beam-analyzing means for determining the intensity of the emergent beam as a function of the beam wavelength, the improvement comprising a thin film of relatively low refractive index and substantially radiation-transparent material on the portion of the internal reflection element's outer surface to be brought into contact with the absorbing medium, said element being positioned such that the beam of radiation traverses the film to impinge on the outer surface thereof at an angle exceeding the critical angle so as to cause said beam to be totally internally reflected from that outer surface except as frustrated at the selected wavelength by the presence of the absorbing medium, the film having the characteristic including thickness such that the beam immediately reflected at the element-film interface for at least the selected wavelength has a phase which is opposite to that of the beam emerging at said interface and has an amplitude which together with the amplitude of the said emerging beam totals substantially that of the incident beam excepting absorption in the medium, whereby a standing wave of high intensity is built up within the film producing enhanced interaction at the selected wavelength with the absorbing medium on the surface thereof.

4. A spectrophotometer as set forth in claim 3 wherein the film has a thickness of the order of one-quarter of the wavelength λ.

5. A spectrophotometer as set forth in claim 4 and including means for varying the angle of incidence of the beam of radiation.

6. A spectrophotometer as set forth in claim 3 wherein the refractive index of the film is higher than that of the absorbing medium, the angle of incidence of the beam and the film thickness are such that the effective optical path through the film is an odd multiple of λ/2, and the beam has a sufficient width for the overall reflection coefficient at the element film interface to be substantially independent of beam position.

7. A spectrophotometer as set forth in claim 3 wherein the internal reflection element has a refractive index $n_1$, the film has a refractive index $n_3$, the absorbing medium is weakly absorbing and has a refractive index $n_2$, the beam is incident on the element-film interface at an angle $\theta_1$ and refracted into said film at an angle $\theta_2$, and $n_3 > n_1 \sin\theta_1 > n_2$, and the film has a thickness $d$ substantially satisfying the following equation:

$$4\pi \frac{n_3 d}{\lambda} \cos\theta_2 + (\theta_r)_6^7 - (\theta_r)_2^5 = (2k+1)\pi$$

where $k$ is an arbitrary integer including zero, $$(\theta_r)_6^7 \text{ and } (\theta_r)_2^5$$

are the phase changes in radians on reflection in the film at the film-medium interface and in the element at the element-film interface, respectively, and the beam-producing means is arranged so that said beam is coherent over a length $l$ in the plane of incidence on the element-film interface where:

$$l \gg \frac{2d \tan\theta_0 (1+r_1)}{1-r_1}$$

where $r_1$ is the reflection coefficient for immediate reflection of said radiation travelling in the element at the element-film interface.

References Cited

UNITED STATES PATENTS 2,409,407  10/1946  Turner.
3,174,414  3/1965  Myer.
3,369,446  2/1968  McCarty.

RONALD L. WIBERT, Primary Examiner

F. L. EVANS, Assistant Examiner

U.S. Cl. X.R.

250—43.5, 83.3; 350—96, 163; 356—51, 244